March 6, 1928.  1,661,530
M. S. FIELD
SPRING SUSPENSION FOR VEHICLES
Filed Jan. 8, 1927    2 Sheets-Sheet 1
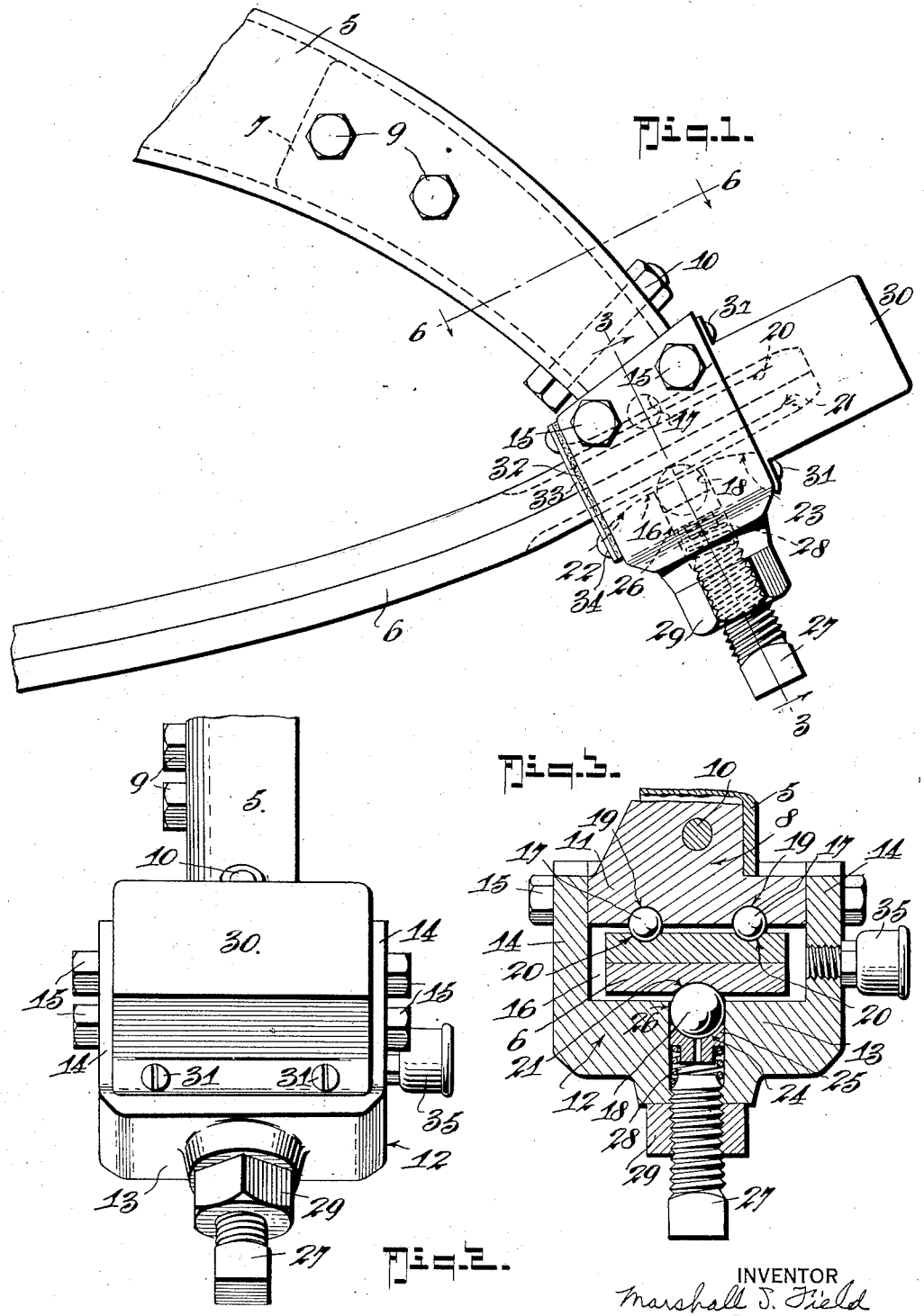
INVENTOR
Marshall S. Field
BY S. George Tate
ATTORNEY

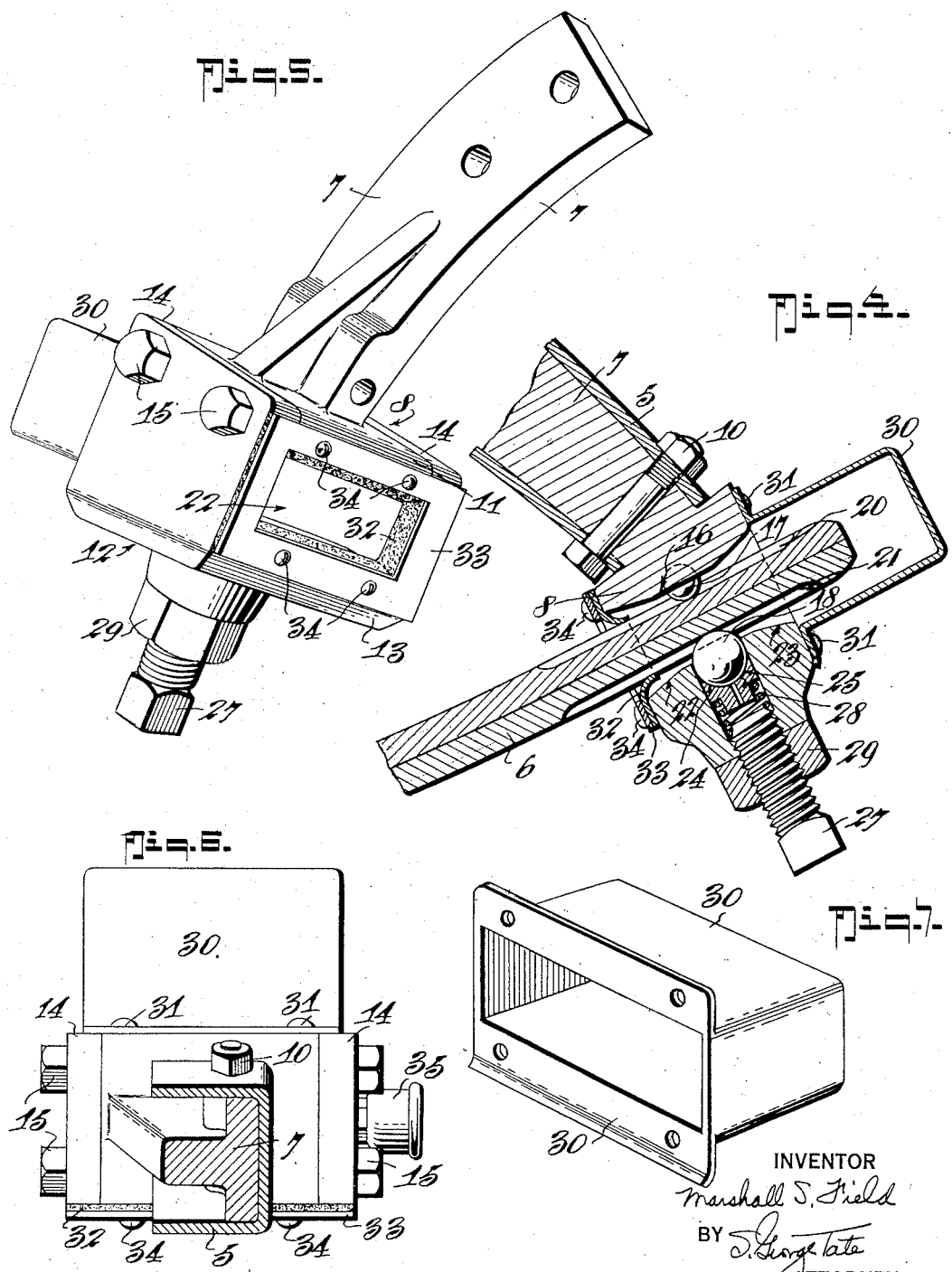

Patented Mar. 6, 1928.

1,661,530

UNITED STATES PATENT OFFICE.

MARSHALL S. FIELD, OF DAVENPORT, IOWA, ASSIGNOR OF TWENTY PER CENT TO JOHN C. MOHL AND FORTY PER CENT TO CHARLES H. SUITER, BOTH OF DAVENPORT, IOWA.

SPRING SUSPENSION FOR VEHICLES.

Application filed January 8, 1927. Serial No. 159,842.

This invention relates to new and useful improvements in spring assemblies for vehicles.

Heretofore vehicle leaf springs have been connected to the vehicle chassis through the medium of shackles which are objectionable in that shackles limit the flexibility of the springs and consequently permit road shocks to be transmitted directly to the vehicle body. Furthermore, the springs are liable to buckle under abnormal road shocks, and torsional strains are transmitted from the body to the springs and thence to the vehicle frame.

Therefore, my invention has among its several objects to provide a spring suspension in which road shocks will be absorbed and will not be transmitted to the body; to provide such a suspension which will avoid buckling of the spring; to provide a suspension which will avoid torsional strains being transmitted from the spring to the frame; to provide a suspension which is composed of but few parts and is therefore cheap to manufacture and easy to assemble, and to provide such a suspension which will greatly increase the life of the spring.

With these and other objects in view which will more fully appear, the nature of the invention will be more clearly understood by following the description, the appended claims, and the several views illustrated in the accompanying drawings.

In the accompanying drawings:

Figure 1 is a side elevation of a spring suspension embodying my invention,

Figure 2 is an end elevation thereof,

Figure 3 is a sectional view taken on the line 3—3 of Figure 1,

Figure 4 is a vertical longitudinal section,

Figure 5 is a perspective view of the attachment, and

Figure 6 is a sectional view taken on the line 6—6 of Figure 1.

Figure 7 is a perspective view of the closure cap.

Like reference numerals designate corresponding parts throughout the several figures of the drawings.

Referring to the accompanying drawings which illustrate one form of my invention, I have shown a spring assembly for vehicles. This assembly includes an arm 5 fixed to the chassis and a leaf spring 6 having connection therewith. Heretofore, the arm 5 and the spring 6 have been connected by a shackle which limited the flexibility of said spring. In my improved spring assembly, I have provided means whereby the flexibility of the spring is unlimited by reason of its connection with the arm 5. To this end, the arm 5, which is channel shaped in cross sections as shown in Figures 1 and 6, receives a shank 7 which is integral with a housing 8, and this shank and arm are secured together by bolts 9—9 and 10, the bolt 10 extending in a plane at right-angles to the bolts 9 whereby the parts are firmly connected together. The housing 8 is disposed at the end of the arm 5 and includes a head or top wall 11, and a substantially U-shaped body portion 12 including a bottom 13 and side walls 14—14, the latter embracing the head 11 and being secured thereto by a bolt 15. Thus, the housing 8 forms a resultant transverse opening or passage 16 for receiving the free end portion of the leaf spring 6. It is, of course, understood that the leaf spring 6 may be formed of a single leaf or by a plurality of leaves.

As above stated the free end of the leaf spring 6 projects into the passage or opening 16 and consequently said spring may readily flex under road shocks and thereby partake of longitudinal movement relative to said housing. In order to reduce all possible friction and also to permit the spring to flex without imparting such action directly to the vehicle frame, I have provided a ball bearing for said leaf spring. This ball bearing specifically includes a pair of upper balls 17—17 and a lower ball 18. The balls 17 are spaced apart and arranged in a plane at right-angles to the longitudinal axis of the spring, or in other words, the balls 17 are arranged in series transverse to the spring. The balls 17 are located in half seats 19—19 formed in the head 11 of the housing and have their lower portions located in grooves 20—20 formed in the upper face of the spring 6. The balls 17 are spaced equi-distant from the center or longitudinal axis of the spring, and the ball 18 has its upper portion located in a groove 21 which extends longitudinally of the lower face of the spring. This groove 21 is centrally located relative to the grooves 20—20. The height of the opening 16 is somewhat greater than the thickness of the spring 6 and the opposite ends of the opening 16 are outwardly flared as indicated at 22 and 23 respectively.

The lower ball 18 forms a yieldable fulcrum for the spring 6 and to this end the ball 18 has its lower portion resting upon a correspondingly shaped seat 24 formed in the upper edge of a follower 25 which is mounted for vertical movements in an opening 26 formed in the bottom 13 of the housing. The lower portion of the opening 26 is threaded for engagement with an adjustable screw 27 and a coiled spring 28 is disposed within the opening 26 between the follower and the screw. A locking nut 29 is associated with the screw for cooperation with the housing to lock said screw in any adjusted position. Thus, by means of the screw 27, spring 28 and follower 25, any suitable tension may be placed on the ball 18 and through the medium of said ball the tension on the spring 6 may be likewise tensioned.

The length of the grooves 20 and 21 is sufficient to permit maximum lengthwise movement in either direction of the leaf spring 6, which movement is of course occasioned by the flexing of the spring under the influence of road shocks.

In order to maintain my improved suspension in a constant state of lubrication, I have created a lubricant compartment. This compartment includes the opening 16 and closures for the opposite ends thereof. The outer end of the openings 16 is closed by an end cap 30 which is of a size to receive the free end of the spring 6 during the pressing of the latter from one extreme to the other. This cap is preferably secured to the housing 8 by screws 31. The inner end of the lubricant chamber is closed by flexing means which permit relative movement between the housing and the spring 6 without permitting any of the lubricant to escape. As specifically illustrated, it comprises an angular felt pad 32 which is secured against the inner face of the housing by a metallic ring 33 secured by screws 34. The inner edges of the felt ring have sliding contact with the spring 6. In order to provide means for inserting the lubricant, I have provided a grease cup 35, as shown in Figs. 2 and 3.

From the foregoing it will be observed that I have provided a spring suspension in which road shocks will be absorbed and will not be transmitted to the vehicle body by reason of the fact that the leaf spring 6 when being flexed will move longitudinally relative to the chassis arm 5; that I have provided a spring suspension which will avoid buckling of the leaf spring; that I have provided a spring suspension which will avoid torsional strains being transmitted from the spring to the vehicle frame by reason of the lower ball acting as a floating pivot or fulcrum for said leaf spring; that I have provided a spring suspension which will greatly increase the life of the leaf spring, and that I have provided a suspension which may be readily applied to vehicles now in general use, and which is composed of but few parts and is therefore cheap to manufacture.

It is of course to be understood that the details of structure and arrangements of parts may be variously changed and modified without departing from the spirit and scope of my invention.

I claim:

1. A spring suspension for vehicles, comprising in combination, a vehicle chassis, a leaf spring having adjacent its free end a pair of grooves extending longitudinally along the upper face thereof and a single groove extending longitudinally along the under face thereof and disposed centrally of the upper grooves, a housing carried by the chassis for receiving the free end of the leaf spring and provided with spaced upper ball-receiving seats registering with the upper grooves and with a single lower ball-receiving seat registering with the lower groove, and balls respectively mounted in said grooves and seats.

2. A spring suspension for vehicles, comprising in combination, a vehicle chassis, a leaf spring having adjacent its free end a pair of grooves extending longitudinally along the upper face thereof and a single groove extending longitudinally along the under face thereof and disposed centrally of the upper grooves, a housing carried by the chassis for receiving the free end of the leaf spring and provided with spaced upper ball-receiving seats registering with the upper grooves and with a single lower ball-receiving seat registering with the lower groove, balls respectively mounted in said grooves and seats, and means for adjusting the position of the lower ball towards or away from the leaf spring.

3. A spring suspension for vehicles, comprising in combination, a vehicle chassis, a leaf spring having adjacent its free end a pair of grooves extending longitudinally along the upper face thereof and a single groove extending longitudinally along the under face thereof and disposed centrally of the upper grooves, a housing carried by the chassis for receiving the free end of the leaf spring and provided with spaced upper ball-receiving seats registering with the upper grooves and with a single lower-ball-receiving seat registering with the lower groove, balls respectively mounted in said grooves and seats, the seat for the lower ball being movable towards and from the leaf spring, and a yieldable support for said movable seat.

4. A spring suspension for vehicles, comprising in combination, a vehicles chassis, a leaf spring having adjacent its free end a pair of grooves extending longitudinally along the upper face thereof and a single groove extending longitudinally along the under face thereof and disposed centrally of the upper grooves, a housing carried by the chassis for receiving the free end of the leaf spring and provided with spaced upper ball-receiving seats registering with the upper grooves and with a single lower ball-receiving seat registering with the lower groove, balls respectively mounted in said grooves and seats, the seat for the lower ball being movable towards and from the leaf spring, a coil spring for supporting said movable seat, and means for adjusting the tension of said spring.

In testimony whereof I hereunto affix my signature.

MARSHALL S. FIELD.